United States Patent
Yang et al.

(10) Patent No.: US 12,488,196 B2
(45) Date of Patent: Dec. 2, 2025

(54) METHOD OF LEARNING TASK MODEL AND LANGUAGE MODEL, AND LEARNING DEVICE FOR PERFORMING THE SAME

(71) Applicant: RIIID INC., Seoul (KR)

(72) Inventors: Yoon Seok Yang, Seoul (KR); Kyu Seok Kim, Seoul (KR); Min Sam Kim, Seoul (KR); June Young Park, Yongin-si (KR)

(73) Assignee: RIIID INC., Seoul (KR)

( * ) Notice: Subject to any disclaimer, the term of this patent is extended or adjusted under 35 U.S.C. 154(b) by 294 days.

(21) Appl. No.: 18/166,021

(22) Filed: Feb. 8, 2023

(65) Prior Publication Data

US 2023/0252244 A1 Aug. 10, 2023

(30) Foreign Application Priority Data

Feb. 8, 2022 (KR) .................. 10-2022-0015945

(51) Int. Cl.
*G06F 40/40* (2020.01)

(52) U.S. Cl.
CPC .................. *G06F 40/40* (2020.01)

(58) Field of Classification Search
None
See application file for complete search history.

(56) References Cited

U.S. PATENT DOCUMENTS

| | | | |
|---|---|---|---|
| 10,978,056 B1 | 4/2021 | Challa et al. | |
| 11,232,358 B1 * | 1/2022 | Ramezani | G06N 3/084 |

FOREIGN PATENT DOCUMENTS

| | | | | |
|---|---|---|---|---|
| CN | 110516033 A | * | 11/2019 | .......... G06F 18/2411 |
| CN | 112287669 A | * | 1/2021 | .......... G06F 40/216 |
| KR | 10-2021-0059845 A | | 5/2021 | |
| KR | 10-2021-0124112 A | | 10/2021 | |

OTHER PUBLICATIONS

Ji-Won Han, et al., "Analysis of the effectiveness of the Recommendation Model for the Customized Learning Course", Proceedings of the KACE (Korea Computer Education Society Conference), 2017, pp. 221-224, vol. 2287-4097(pISSN).
Korean Office Action dated Sep. 18, 2025 in Application No. 10-2022-0116099.

* cited by examiner

*Primary Examiner* — Pierre Louis Desir

(74) *Attorney, Agent, or Firm* — Sughrue Mion, PLLC

(57) ABSTRACT

A method of learning a task model and a language model according to an embodiment of the present application includes: acquiring log data for each user for a content set consumed by a plurality of users and content included in the content set; acquiring text embedding for the content included in the content set through a pretrained language model (PLM); acquiring an output value related to a task from the text embedding and the log data through a task model; updating a weight of the task model based on the output value and a target value of the task; and acquiring back-propagation information for training the language model from the task model, and training the language model based on the back-propagation information.

5 Claims, 5 Drawing Sheets

METHOD OF LEARNING TASK MODEL AND LANGUAGE MODEL, AND LEARNING DEVICE FOR PERFORMING THE SAME

CROSS-REFERENCE TO RELATED APPLICATION

This application claims priority to and the benefit of Korean Patent Application No. 10-2022-0015945, filed on Feb. 8, 2022, the disclosure of which is incorporated herein by reference in its entirety.

BACKGROUND

1. Field of the Invention

The present application relates to a method of learning a task model and a language model, and a learning device for performing the same. Specifically, the present application relates to a method of learning a task model and a language model performing natural language processing through a collaborative filtering method, and a learning device for performing the same.

2. Discussion of Related Art

As artificial intelligence technologies develop, the artificial intelligence technologies are being used in various industries. In particular, in the field of education or content recommendation, research and development on technologies for developing a model (task model) that applies artificial intelligence technologies to compute user knowledge or for improving the performance of the task model are actively being conducted. In particular, due to the nature of the education or content, research on technologies for training an artificial intelligence model by using a language model for analyzing linguistic relationships, that is, a large language model (pretrained language model), and a collaborative filtering learning method is attracting attention.

However, the large language model includes a large number of parameters in order to improve the performance, and these many parameters are learned. For example, language models such as GPT-3 need to learn about 175 billion parameters. In particular, the large language model has limitations in that the amount of computation increases in proportion to the number of trainings, and in that training time and training costs inevitably increase exponentially as the amount of computation increases, which causes a great burden on actual use of the large language model.

Accordingly, there is a need to develop a learning method of a task model and a language model capable of reducing the amount of computation, and a learning device for performing the same.

SUMMARY OF THE INVENTION

The present invention is directed to providing a method of learning a task model and a language model capable of reducing the amount of computation required for learning the task model and language model, and a learning device for performing the same.

Objects to be solved by the present disclosure are not limited to the abovementioned objects, and objects that are not mentioned will be clearly understood by those skilled in the art to which the present disclosure pertains from the present specification and the accompanying drawings.

According to an aspect of the present invention, there is provided a method of learning a task model and a language model, including: acquiring log data for each user for a content set consumed by a plurality of users and content included in the content set; acquiring text embedding for the content included in the content set through a pretrained language model (PLM); acquiring an output value related to a task from the text embedding and the log data through a task model; updating a weight of the task model based on the output value and a target value of the task; and acquiring back-propagation information for training the language model from the task model, and training the language model based on the back-propagation information.

According to an aspect of the present invention, there is provided a learning device including a transceiver configured to transmit/receive a content set including a plurality of pieces of content and log data for each user for the content; and a controller configured to train the language model and the task model from the content and the log data, in which the controller may be configured to acquire the log data for each user for a content set consumed by a plurality of users and the content included in the content set, acquire text embedding for the content included in the content set through a PLM, acquire an output value related to a task from the text embedding and the log data through the task model, update a weight of the task model based on the output value and the target value of the task, acquire back-propagation information for training the language model from the task model, and train the language model based on the back-propagation information.

Technical solutions of the present disclosure are not limited to the abovementioned solutions, and solutions that are not mentioned will be clearly understood by those skilled in the art to which the present disclosure pertains from the present specification and the accompanying drawings.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
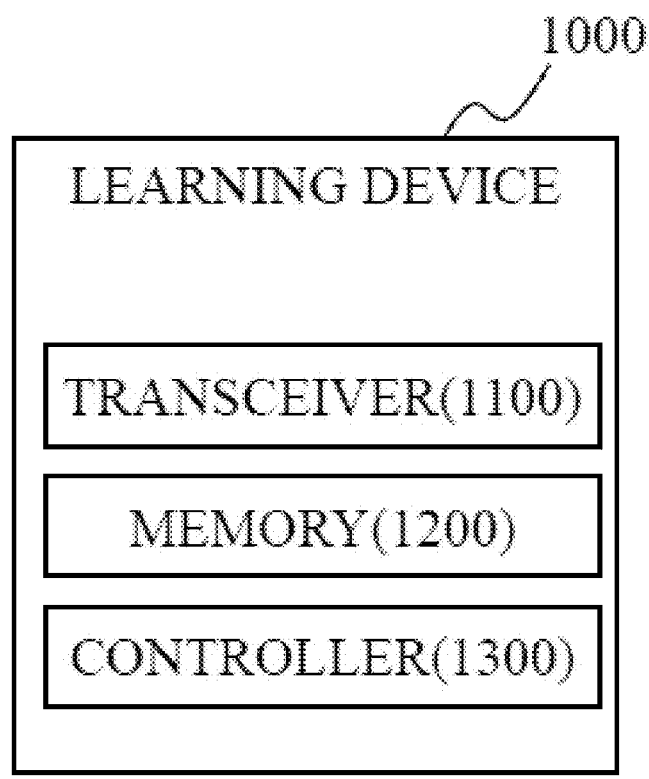
FIG. 1 is a schematic diagram of a learning device according to an embodiment of the present application.

Objects, features, and advantages of the present application will become more obvious from the following detailed description provided in relation to the accompanying drawings. However, the present application may be variously modified and have several exemplary embodiments. Hereinafter, specific exemplary embodiments of the present invention will be illustrated in the accompanying drawings and be described in detail.

In principle, the same reference numerals denote the same constituent elements throughout the specification. Further, elements having the same function within the scope of the same idea illustrated in the drawings of each embodiment will be described using the same reference numerals, and overlapping description thereof will be omitted.

When it is determined that detailed description of a known function or configuration related to the present application may obscure the gist of the present disclosure, detailed description thereof will be omitted. In addition, numbers (for example, first, second, etc.) used in the description process of the present specification are only identification symbols for distinguishing one component from other components.

In addition, suffixes "module" and "unit" for components used in the following embodiments are used only in order to easily make the disclosure. Therefore, these terms do not have meanings or roles that distinguish the components from each other in themselves.

In the following embodiments, singular forms include plural forms unless interpreted otherwise in context.

In the following embodiments, the terms "include" and "have" mean that a feature or element described in the specification is present, but do not preclude in advance the possibility that one or more other features or components may be added.

Sizes of components may be exaggerated or reduced in the accompanying drawings for convenience of explanation. For example, the size and thickness of each component illustrated in the drawings are arbitrarily indicated for convenience of description, and the present invention is not necessarily limited to the illustration.

In a case where certain embodiments can be otherwise implemented, the order of specific processes may be performed different from the order in which the processes are described. For example, two processes described in succession may be performed substantially simultaneously, or may be performed in an order opposite to the order described.

In the following embodiments, when components are connected, it includes not only a case where components are directly connected but also a case where components are indirectly connected via certain component interposed between the components.

For example, in the present specification, when components and the like are electrically connected, it includes not only a case where components are directly electrically connected, but also a case where components are indirectly electrically connected via a certain component interposed between the components.

According to an embodiment of the present application, a method of learning a task model and a language model may include: acquiring log data for each user for a content set consumed by a plurality of users and content included in the content set; acquiring text embedding for the content included in the content set through a pretrained language model (PLM); acquiring an output value related to a task from the text embedding and the log data through a task model; updating a weight of the task model based on the output value and a target value of the task; and acquiring back-propagation information for training the language model from the task model and training the language model based on the back-propagation information.

According to an embodiment of the present application, the training of the language model may include: classifying the log data of the user for each content item included in the content set; and learning the language model based on the content corresponding to the classified log data of the user to increase accuracy of the task model.

According to an embodiment of the present application, the learning of the language model may further include updating a parameter included in the language model based on the back-propagation information corresponding to the content item.

According to an embodiment of the present application, time complexity required to learn the language model may be related to the number of pieces of content included in the content set.

According to an embodiment of the present application, a computer-readable recording medium in which a program for executing the learning method is recorded may be provided.

According to an embodiment of the present application, a learning device includes a transceiver configured to transmit/receive a content set including a plurality of pieces of content and log data for each user for the content; and a controller configured to train the language model and the task model from the content and the log data, in which the controller may be configured to acquire the log data for each user for a content set consumed by a plurality of users and the content included in the content set, acquire text embedding for the content included in the content set through a PLM, acquire an output value related to a task from the text embedding and the log data through the task model, update a weight of the task model based on the output value and the target value of the task, acquire back-propagation information for training the language model from the task model and train the language model based on the back-propagation information.

Hereinafter, with reference to FIGS. 1 to 5, a learning method of a task model and a natural language processing model (or language model, hereinafter referred to as a language model) according to embodiments of the present application, and a learning device 1000 performing the same will be described.

The learning device 1000 according to the embodiment of the present application may perform an operation of learning a task model and a language model using a collaborative filtering technique. Specifically, the learning device 1000 may acquire text embedding for text included in content through a pretrained language model (PLM). In addition, the learning device 1000 may acquire an output value related to a task from text embedding and log data through a task model. Also, the learning device 1000 may update parameters of the task model based on the output value and the target value of the task. In addition, the learning device 1000 may be configured to acquire back-propagation information from the task model and additionally train a PLM based on the back-propagation information.

FIG. 1 is a schematic diagram of the learning device 1000 according to the embodiment of the present application.

The learning device 1000 according to the embodiment of the present application may include a transceiver 1100, a memory 1200, and a controller 1300.

The transceiver 1100 may perform communication with an arbitrary external device. For example, the learning device 1000 may acquire, through the transceiver 1100, execution data (e.g., layer information, computation information, and/or or parameter information, etc. of the language model) for executing a PLM and/or a language model. As another example, the learning device 1000 may acquire content information and/or log data for the content included in a content set consumed by a user from a user terminal through the transceiver 1100.

The learning device 1000 may access a network to transmit/receive various types of data through the transceiver 1100. The transceiver 1100 may largely include a wired type and a wireless type. Since the wired type and the wireless type have their respective strengths and weaknesses, in some cases, the wired type and the wireless type may be simultaneously provided in the learning device 1000. Here, in the case of the wireless type, a wireless local area network (WLAN)-based communication method such as Wi-Fi may be mainly used. Alternatively, in the case of the wireless type, cellular communication, for example, a Long Term Evolution (LTE) and 5G-based communication method may be used. However, the wireless communication protocol is not limited to the above-described example, and an arbitrary suitable wireless type communication method may be used. In the case of the wired type, local area network (LAN) or Universal Serial Bus (USB) communication is a representative example, and other methods are also possible.

The memory 1200 may store various types of information. Various types of data may be temporarily or semi-permanently stored in the memory 1200. Examples of the memory 1200 may include a hard disk drive (HDD), a solid state drive (SSD), a flash memory, a read-only memory (ROM), a random access memory (RAM), or the like. The memory 1200 may be provided in a form embedded in the learning device 1000 or in a detachable form. The memory 1200 may store various types of data necessary for the operation of the learning device 1000 in addition to an operating system (OS) for driving the learning device 1000 or a program for operating each component of the learning device 1000.

The controller 1300 may control the overall operation of the learning device 1000. For example, as will be described below, the controller 1300 may control the overall operation of the learning device 1000, including an operation of acquiring log data for each user for a content set consumed by a plurality of users and/or content included in the content set, an operation of acquiring text embedding for the content included in the content set, an operation of acquiring an output value related to the task from text embedding and the log data, an operation of updating a weight of the task model based on the output value and the target value of the task, and/or an operation of acquiring back-propagation information for training a language model and training the language model based on the back-propagation information, etc. Specifically, the controller 1300 may load and execute a program for the overall operation of the learning device 1000 from the memory 1200. The controller 1300 may be implemented as an application processor (AP), a central processing unit (CPU), or a device similar thereto according to hardware, software, or a combination thereof. In this case, the controller 1300 may be provided in an electronic circuit form processing an electrical signal to perform a control function in terms of hardware, and may be provided in a program or code form driving the hardware circuit in terms of software.

Figure 2:
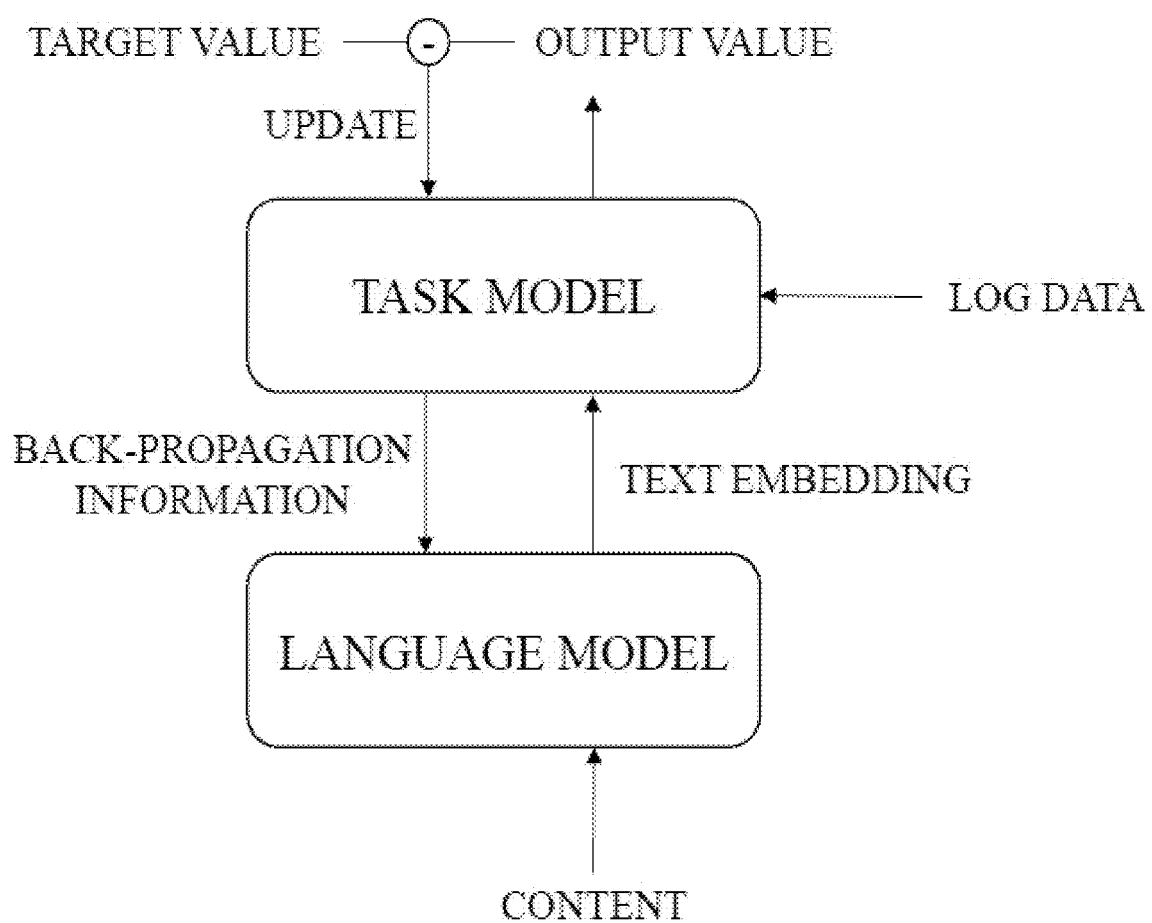
FIG. 2 is a diagram illustrating an aspect of a method of learning a task model and a language model according to an embodiment of the present application.

Hereinafter, an operation of learning a task model and a language model of the learning device 1000 according to an embodiment of the present application for achieving the above objects and effects will be described in detail with reference to FIG. 2. FIG. 2 is a diagram illustrating an aspect of a method of learning a task model and a language model according to an embodiment of the present application.

The learning device 1000 according to the embodiment of the present application may acquire a PLM. In detail, the learning device 1000 may acquire execution data (e.g., layer information, computation information, and/or weight (parameter) information of the language model) for executing the PLM. Here, the PLM may be one of a BERT model, a GPT-3 model, a ROBERTA model, a UniLM model, and a MiniLM model. However, these are only examples, and the PLM may be an arbitrary suitable language model.

The learning device 1000 according to the embodiment of the present application may acquire content included in a content set consumed by a plurality of users. Here, the content may include text data, and the content may include data including arbitrary text including problems, news, web pages, and the like. Meanwhile, the content set may include a plurality of pieces of content including first content and second content.

The learning device 1000 according to the embodiment of the present application may acquire the text embedding related to the text included in the content from the content through the PLM. In detail, the learning device 1000 may input content to the PLM and acquire the text embedding related to the text of the content from the PLM. In addition, the learning device 1000 may be implemented to input the text embedding extracted through the PLM to the task model.

In addition, the learning device 1000 according to the embodiment of the present application may acquire log data of users for content included in a content set. In detail, the learning device 1000 may acquire log data of a first user, log data of a second user, and/or log data of an $N^{th}$ user for the first content. Alternatively, the learning device 1000 may acquire log data of a first user, log data of a second user, and/or log data of an $N^{th}$ user for the second content.

Meanwhile, when content is the problem, the learning device 1000 may acquire solution log data of users for the problem. As another example, when content is news, the learning device 1000 may acquire reading log data of users about the news. Hereinafter, the case where content is a problem will be described as an example. However, this is only for convenience of description and should not be interpreted as limiting.

The learning device 1000 according to the embodiment of the present application may acquire an output value from text embedding and log data through a task model. In detail, the learning device 1000 may input the text embedding extracted from the content and the log data of the user for the content to the task model, and acquire the output value output through the task model.

In this case, the output value may be a value related to the task (or work) of the task model. For example, when the content is a problem, the task of the task model may be to compute a user's expected score. In this case, the output value output through the task model may be a value related to the user's expected score. As another example, when the content is the problem, the task of the task model may be to determine a problem to recommend to a user. In this case, the output value output through the task model may be a value related to the determined recommendation problem. As another example, for example, when the content is the problem, the task of the task model may be to compute an expected correct answer rate for an arbitrary problem of a user. In this case, the output value output through the task model may be a value related to the expected correct answer rate for the arbitrary problem.

The learning device 1000 according to the embodiment of the present application may update a task model based on an output value and a target value output through the task model. Specifically, the learning device 1000 may compare the output value and the target value, and adjust or update a weight (or parameter) of an arbitrary node included in the task model so that the difference between the output value and the target value is minimized. For example, the learning device 1000 may be configured to acquire a loss function based on a result of comparing the output value and the target value and assign the loss function to the task model to adjust a weight of an arbitrary node included in the task model.

The learning device 1000 according to the embodiment of the present application may acquire back-propagation information for additionally training the PLM from the task model. The back-propagation information is associated with the accuracy of the task model and may include update information indicating in which direction and by how much the weight (or parameter) included in the language model changes.

The learning device 1000 may additionally train the PLM based on the back-propagation information in order to increase the accuracy of the task model. Specifically, the learning device 1000 may input the back-propagation information to the language model, and since the back-propagation information includes update information indicating in which direction and by how much the weight of the language model should change in order to increase the accuracy of the task model, the language model can update or adjust the weight (or parameter) included in the language model based on the back-propagation information.

Figure 3:
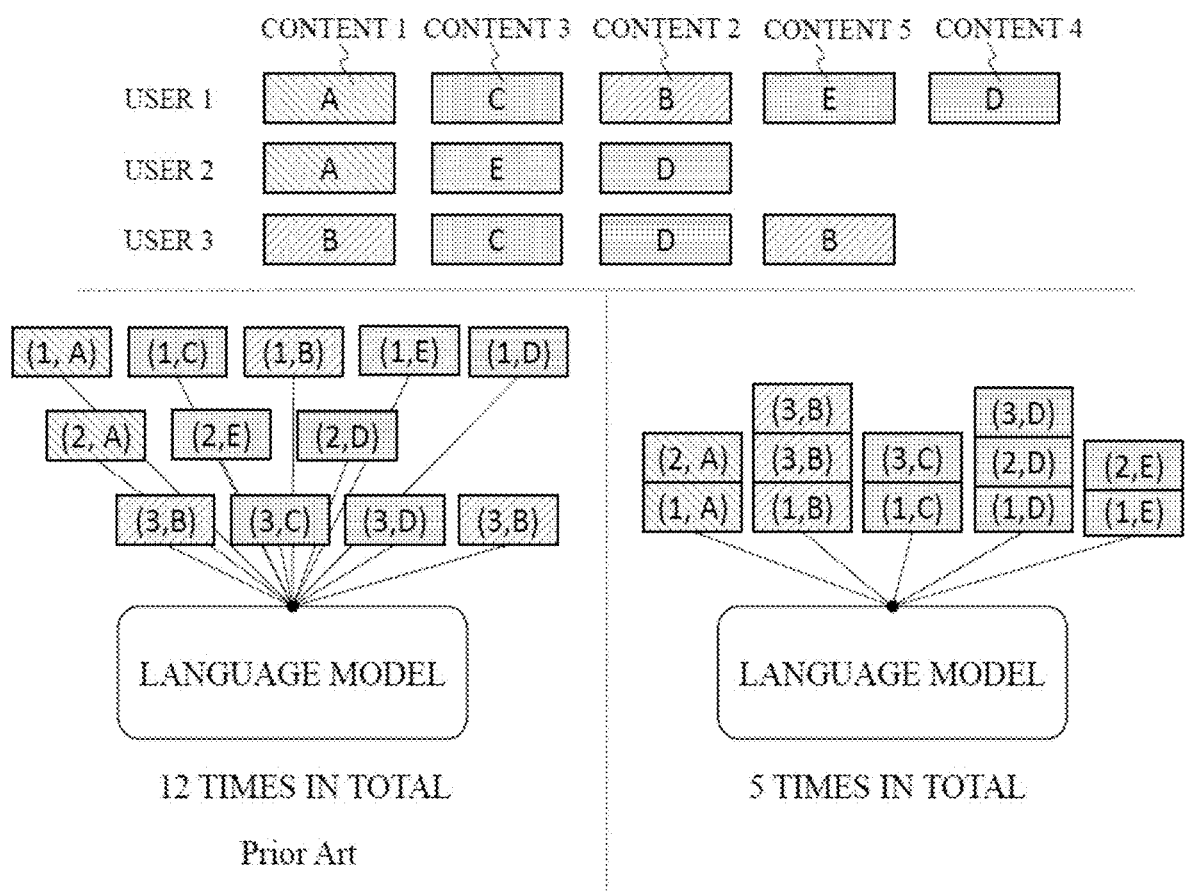
FIG. 3 is a diagram for comparing a learning method according to an embodiment of the present application with the conventional learning method.

Hereinafter, a method of learning a language model according to an embodiment of the present application will be described in more detail with reference to FIG. 3. FIG. 3 is a diagram for comparing a learning method according to an embodiment of the present application with the conventional learning method.

According to the conventional learning method, the PLM has trained a language model a number of times corresponding to the product of the number of users and the average number of pieces of consumed content (or the average number of solutions).

It is assumed that user 1 has performed solutions for content 1 (A in FIG. 3), content 2 (B in FIG. 3), content 3 (C in FIG. 3), content 4 (D in FIG. 3), and content 5 (E in FIG. 3), user 2 has performed solutions for content 1 (A in FIG. 3), content 4 (D in FIG. 3), and content 5 (E in FIG. 3), and user 3 has performed a solution for content 2 (B in FIG. 3) twice and solutions for content 3 (C in FIG. 3) and content 4 (D in FIG. 3). In this case, according to the conventional learning method, the training has been performed to adjust the weight of the language model a number of times (e.g., 12 times) corresponding to the product of the number of users (e.g., 3 people in FIG. 3) and the average number of solutions (e.g., 4 times in FIG. 3). However, since the large language model includes a large number of parameters to improve performance, there is a problem that a large amount of computation is inevitably required as the number of times training is performed increases. In addition, there was a problem in that training time and training costs significantly increase as the amount of computation increases.

The learning device 1000 according to the embodiment of the present application may additionally train language models for each piece of content. Specifically, the learning device 1000 may be configured to classify log data of users for each piece of content included in a content set, and to learn language models for each classified content item. In this case, the learning device 1000 may adjust the weights of the language models for each content item to increase the accuracy of the task model.

According to an embodiment, the learning device 1000 may classify log data of users for each content item. For example, the learning device 1000 may classify log data for content 1 (A in FIG. 3) of user 1 and log data for content 1 (A in FIG. 3) of user 2 as a first log data set for content 1 (A). In addition, the learning device 1000 may classify log data of user 1 for content 2 (B in FIG. 3) and log data of user 3 for content 2 (B in FIG. 3) as a second log data set. In addition, the learning device 1000 may classify log data of user 1 for content 3 (C in FIG. 3) and log data of user 3 for content 3 (C in FIG. 3) as a third log data set. In addition, the learning device 1000 may classify log data of user 1 for content 4 (D in FIG. 3), log data of user 2 for content 4 (D in FIG. 3), and log data of user 3 for content 4 (D in FIG. 3) as a fourth log data set. In addition, the learning device 1000 may classify log data of user 1 for content 5 (E in FIG. 3) and log data of user 2 for content 5 (E in FIG. 3) as a fifth log data set.

According to an embodiment, the learning device 1000 may train the language model by updating the parameter included in the language model based on back-propagation information corresponding to each content item based on the classified content items. For example, the learning device 1000 may input each of the first to fifth log data sets and/or content corresponding to each log data set to a language model. In this case, the language model may adjust weights included in the language model based on the input value and the back-propagation information corresponding to each piece of content.

Through the learning method of training language models for each content item, the language model may be trained as much as the total number of pieces of content (e.g., a total of 5 times in FIG. 3). Therefore, according to an embodiment of the present application, the number of times the language model performs learning may be significantly reduced compared to the related art. For example, referring to FIG. 3, the related art requires of the language model to perform training 12 times, whereas the learning method of the present application requires the language model to perform training 5 times. That is, the learning method according to the embodiment of the present application may reduce time complexity associated with a language model while maintaining the performance of a task model at a target level. Specifically, the time complexity of the related art is proportional to the number of users * the average number of pieces of content consumed by users (e.g., the number of users (3) * the average number of pieces of content consumed by users (4) in FIG. 3). On the other hand, because the time complexity of the present invention is related to the number of pieces of content (e.g., the number of pieces of content (5) in FIG. 3), the time complexity may be relatively reduced compared to that of the related art. Accordingly, the learning method according to the embodiment of the present application may provide an advantageous effect of reducing the time and cost required for learning the task model and the language model.

Meanwhile, specific values of the number of users and the number of pieces of content are exemplified in the description of FIG. 3. However, this is only for convenience of explanation and should not be construed as limiting. In addition, the learning method according to the embodiment of the present application may be analogously applied to the case of an arbitrary number of users and an arbitrary number of pieces of content.

According to the embodiment of the present application, the learned task model and language model may constitute one target model. In this case, the target model may be used to perform tasks such as computing the user's expected correct answer probability (or expected score) for new content (e.g., new problem content and/or new news content, etc.) based on the new content or recommending content having high relevance to the new content.

According to an embodiment, the target model may need to be updated according to the result of the task for the new content. In this case, the weight of the task model and/or the weight of the language model of the target model may be updated according to the result of the task for the new content.

According to an embodiment, when the task is performed using the target model, the "learning" of the language model may be deactivated in order to reduce the amount of computation and increase the computation speed.

Hereinafter, the learning method according to the embodiment of the present application will be described in more detail with reference to FIGS. 4 and 5. In describing the learning method, some embodiments with features overlapping those described above may be omitted, but this is only for convenience of description and should not be construed as limiting.

Figure 4:
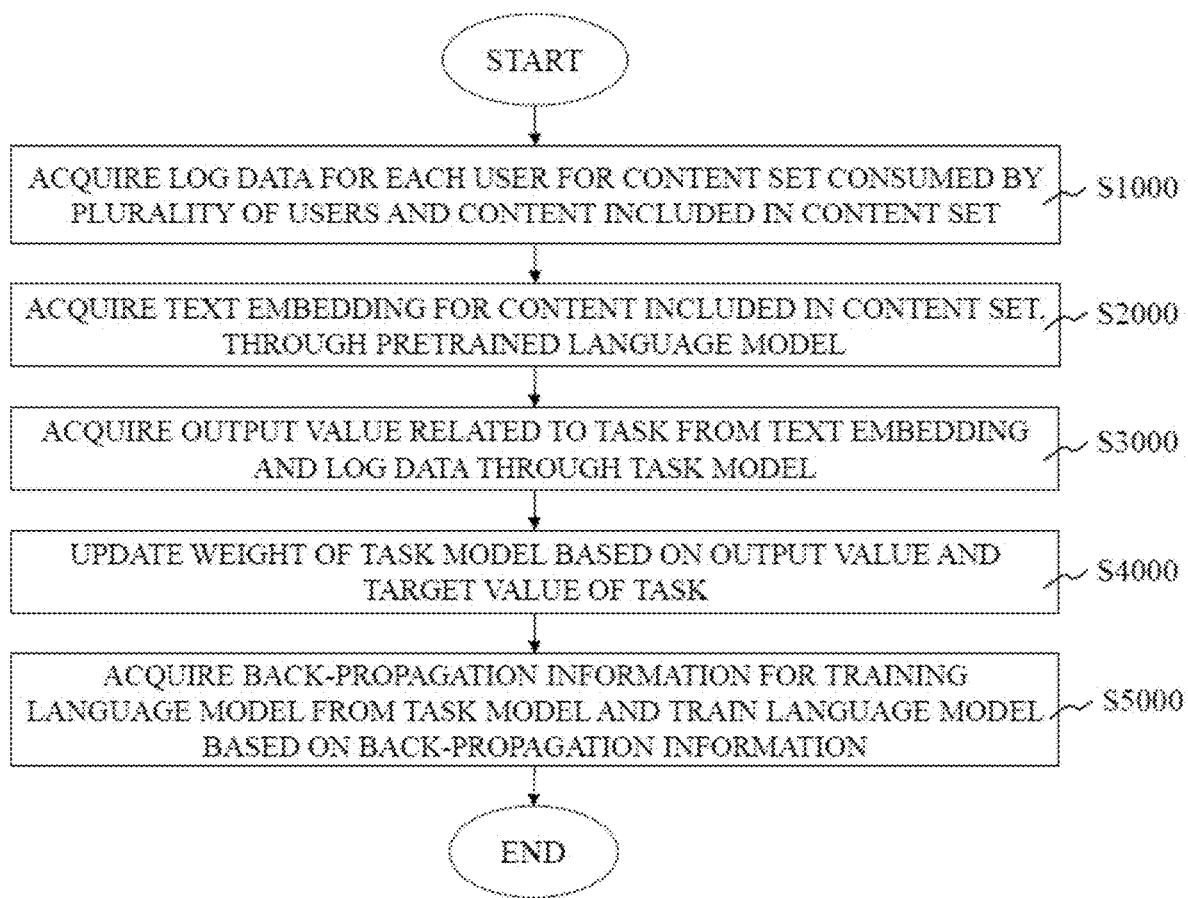
FIG. 4 is a flowchart illustrating an aspect of a method of learning a task model and a language model according to an embodiment of the present application.

FIG. 4 is a flowchart illustrating an aspect of a method of learning a task model and a language model according to an embodiment of the present application.

The learning method according to the embodiment of the present application includes acquiring log data for each user for a content set consumed by a plurality of users and content included in the content set (S1000), acquiring text embedding for the content included in the content set through a PLM (S2000), acquiring an output value related to a task from the text embedding and the log data through a task model (S3000), updating a weight of the task model based on the output value and a target value of the task (S4000), and acquiring back-propagation information for training the language model from the task model and training the language model based on the back-propagation information (S5000).

In the acquiring of the log data for each user for the content set consumed by the plurality of users and the content included in the content set (S1000), the learning device 1000 may acquire the content included in the content set consumed by the plurality of users. Here, the content may include text data, and may include encompassing data including arbitrary text, including problems, news, web pages, and the like.

In addition, in the acquiring of the log data for each user for the content set consumed by the plurality of users and the content included in the content set (S1000), the learning device 1000 may acquire log data of users for the content included in the content set. In detail, the learning device 1000 may acquire log data of a first user, log data of a second user, and/or log data of an $N^{th}$ user for the first content. Alternatively, the learning device 1000 may acquire log data of a first user, log data of a second user, and/or log data of an $N^{th}$ user for the second content. For example, when the content is the problem, the learning device 1000 may acquire solution log data of users for the problem.

In the acquiring of the text embedding for the content included in the content set through the PLM, the learning device 1000 may acquire the text embedding related to the text included in the content from the content through the PLM. In detail, the learning device 1000 may input content to the PLM and acquire the text embedding related to the text of the content from the PLM. In addition, the learning device 1000 may be implemented to input the text embedding extracted through the PLM to the task model.

In the acquiring of the output value related to the task from the text embedding and the log data through the task model (S3000), the learning device 1000 may acquire the output value from the text embedding and the log data through the task model. In detail, the learning device 1000 may input the text embedding extracted from the content and the log data of the user for the content to the task model, and acquire the output value output through the task model. In this case, the output value may be a value related to the task of the task model.

For example, when the content is the problem, the task of the task model may be to compute a user's expected score. In this case, the output value output through the task model may be a value related to the user's expected score.

For example, when the content is the problem, the task of the task model may be to determine a problem to recommend to a user. In this case, the output value output through the task model may be a value related to the determined recommendation problem.

For example, when the content is the problem, the task of the task model may be to compute an expected correct answer rate for a user's arbitrary problem. In this case, the output value output through the task model may be a value related to the expected correct answer rate for arbitrary problem.

For example, when the content is the news, the task of the task model may be to determine similar content or other highly relevant news content. In this case, the output value output through the task model may be a value related to the determined news content.

In the updating of the weight of the task model based on the output value and the target value of the task (S4000), the learning device 1000 may update the task model based on the output value and the target value output through the task model. Specifically, the learning device 1000 may compare the output value and the target value, and adjust or update a weight (or parameter) of an arbitrary node included in the task model so that the difference between the output value and the target value is minimized. For example, the learning device 1000 may be configured to acquire a loss function based on a result of comparing the output value and the target value and assign the loss function to the task model to adjust a weight of an arbitrary node included in the task model.

In the acquiring of the back-propagation information for training the language model from the task model and the training of the language model based on the back-propagation information (S5000), the learning device 1000 may acquire the back-propagation information for additionally training the PLM from the task model. Here, the backpropagation information may include the update information associated with the accuracy of the task model and indicating in which direction and by how much the weight of the language model changes.

In addition, in the acquiring of the back-propagation information for training the language model from the task model and the training of the language model based on the back-propagation information (S5000), the learning device 1000 may additionally train the PLM based on the back-propagation information to increase the accuracy of the task model. Specifically, the learning device 1000 may input the back-propagation information to the language model, and since the back-propagation information includes the information indicating in which direction and by how much the weight of the language model should change in order to increase the accuracy of the task model, the language model can update or adjust the weight (or parameter) included in the language model based on the back-propagation information.

Figure 5:
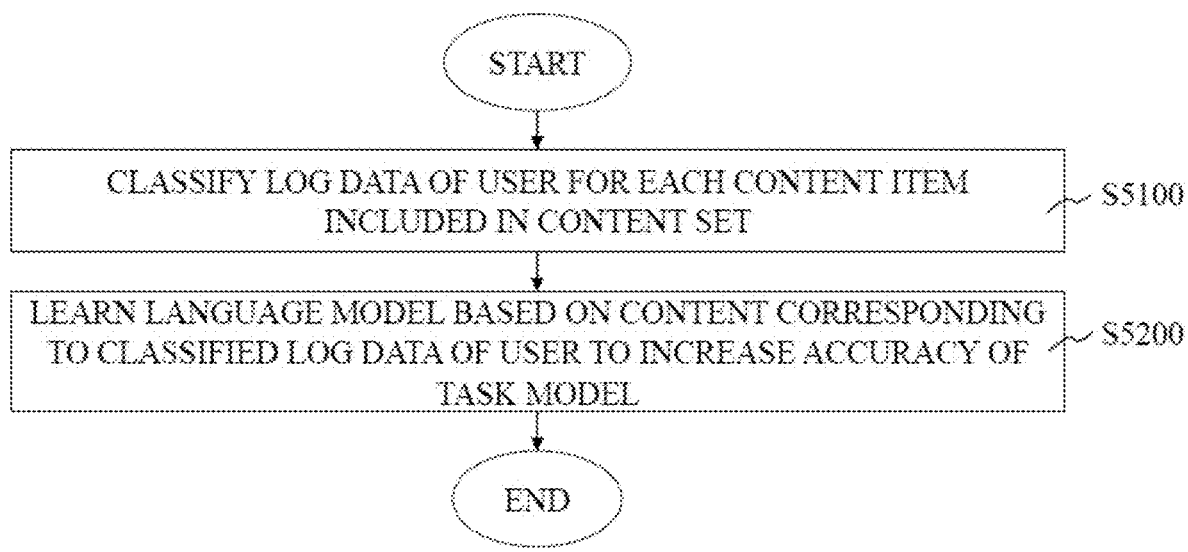
FIG. 5 is a flowchart specifying an operation of training a language model according to an embodiment of the present application.

FIG. 5 is a flowchart specifying an operation of training a language model according to an embodiment of the present application.

The training of the language model according to the embodiment of the present application may include classifying log data of a user for each content item included in a content set (S5100) and learning the language model based on the classified log data of the user in order to increase the accuracy of the task model (S5200).

In the classifying of the log data of the user for each content item included in the content set (S5100), the learning device 1000 may classify the log data of the users for each content item. For example, referring back to FIG. 3, the learning device 1000 may classify log data for content 1 (A in FIG. 3) of user 1 and log data for content 1 (A in FIG. 3) of user 2 as a first log data set for content 1 (A). In addition, the learning device 1000 may classify log data of user 1 for content 2 (B in FIG. 3) and log data of user 3 for content 2 (B in FIG. 3) as a second log data set. In addition, the learning device 1000 may classify log data of user 1 for content 3 (C in FIG. 3) and log data of user 3 for content 3 (C in FIG. 3) as a third log data set. In addition, the learning device 1000 may classify log data of user 1 for content 4 (D in FIG. 3), log data of user 2 for content 4 (D in FIG. 3), and log data of user 3 for content 4 (D in FIG. 3) as a fourth log data set. In addition, the learning device 1000 may classify log data of user 1 for content 5 (E in FIG. 3) and log data of user 2 for content 5 (E in FIG. 3) as a fifth log data set.

In the learning of the language model based on the classified log data of the user in order to increase the accuracy of the task model (S5200), the learning device 1000 may train the language model by updating the parameter included in the language model based on the back-propagation information corresponding to each content item based on the classified content item. For example, the learning device 1000 may input each of the first to fifth log data sets and/or content corresponding to each log data set to a language model. In this case, the language model may adjust weights included in the language model based on the input value and the back-propagation information corresponding to each piece of content.

According to a method and device for learning a task model and a language model according to an embodiment of the present application, it is possible to reduce time complexity by learning the language models for each piece of content to reduce the number of times the language models perform learning.

According to the method and device for learning a task model and a language model according to an embodiment of the present application, it is possible to significantly reduce time and cost of training the language model while maintaining the performance of the task model at a target level.

Various operations of the learning device 1000 described above may be stored in the memory 1200 of the learning device 1000, and the controller 1300 of the learning device 1000 may be provided to perform the operations stored in the memory 1200.

Features, structures, effects, etc., described in the above embodiments are included in at least one embodiment of the present disclosure, and are not necessarily limited only to one embodiment. Furthermore, features, structures, effects, etc., illustrated in each embodiment can be practiced by being combined or modified for other embodiments by those of ordinary skill in the art to which the embodiments pertain. Accordingly, the content related to such combinations and modifications should be interpreted as being included in the scope of the present invention.

According to a method and device for learning a task model and a language model according to an embodiment of the present application, it is possible to reduce time complexity by learning the language models for each piece of content to reduce the number of times the language models perform learning.

According to the method and device for learning a task model and a language model according to an embodiment of the present application, it is possible to significantly reduce time and cost of training the language model while maintaining the performance of the task model at a target level.

Effects of the present disclosure are not limited to the abovementioned effects, and effects that are not mentioned will be clearly understood by those skilled in the art to which the present disclosure pertains from the present specification and the accompanying drawings.

Although an exemplary embodiment of the present invention has been mainly described hereinabove, this is only an example and does not limit the present invention. Those skilled in the art to which the present invention pertains may understand that several modifications and applications that are not described in the present specification may be made without departing from the spirit of the present invention. That is, each component specifically shown in the embodiment may be implemented with modifications. In addition, differences associated with these modifications and applications are to be interpreted as being included in the scope of the present specification as defined by the following claims.

What is claimed is:

1. A method of learning a task model and a pretrained language model (PLM) by a learning device for tuning the task model using the PLM, the method comprising:

acquiring log data of a plurality of users for contents included in a content set consumed by the plurality of users and the contents included in the content set, the plurality of users including a first user and a second user, and the contents including a first content and a second content;

acquiring text embedding for the contents included in the content set through the PLM;

acquiring an output value related to a task of the task model from the text embedding and the log data through the task model;

updating a weight of the task model based on the output value and a target value of the task; and acquiring back-propagation information for training the PLM from the task model and training the PLM based on the back-propagation information, wherein the method further comprises:

acquiring execution data for executing the PLM, the executing data including at least one of layer information, computation information and weight information of the PLM, and acquiring the PLM based on the execution data, the PLM being one of a Bidirectional Encoder Representations from Transformers (BERT) model, a Generative Pre-trained Transformer 3 (GPT-3) model, a Robustly Optimized BERT Pre-Training Approach (ROBERTA) model, a Unified pre-trained Language Model (UniLM), and a Minimal Language Model (MiniLM), wherein the training of the PLM includes:

classifying the log data of the plurality of users as a plurality of log data sets according to each content of the contents, wherein the classifying of the log data of the plurality of users includes (i) classifying log data of the first user for the first content and log data of the second user for the first content as a first log data set of the plurality of log data sets, and (ii) classifying log data of the first user for the second content and log data of the second user for the second content as a second log data set of the plurality of log data sets, and training the PLM based on back-propagation information corresponding to each content of the contents by inputting each of the plurality of classified log data sets to the PLM to increase accuracy of the task model, wherein a total number of the classified log data sets is the same as a total number of the contents, and wherein the training of the PLM based on the back-propagation information corresponding to each content of the contents is performed as many as the total number of the contents.

2. The method of claim 1, wherein the training of the PLM further includes updating a parameter included in the PLM based on the back-propagation information corresponding to each content of the contents.

3. The method of claim 1, wherein time complexity required to train the PLM is related to the total number of the contents included in the content set.

4. A non-transitory computer-readable recording medium in which a computer program executed by a computer is recorded, the computer program comprising:

acquiring log data of a plurality of users for contents included in a content set consumed by the plurality of users and the contents included in the content set, the plurality of users including a first user and a second user, and the contents including a first content and a second content;

acquiring text embedding for the contents included in the content set through a pretrained language model (PLM);

acquiring an output value related to a task of a task model from the text embedding and the log data through the task model;

updating a weight of the task model based on the output value and a target value of the task; and acquiring back-propagation information for training the PLM from the task model and training the PLM based on the back-propagation information, wherein the computer program further comprises:

acquiring execution data for executing the PLM, the executing data including at least one of layer information, computation information and weight information of the PLM, and acquiring the PLM based on the execution data, the PLM being one of a Bidirectional Encoder Representations from Transformers (BERT) model, a Generative Pre-trained Transformer 3 (GPT-3) model, a Robustly Optimized BERT Pre-Training Approach (ROBERTA) model, a Unified pre-trained Language Model (UniLM), and a Minimal Language Model (MiniLM), wherein the training of the PLM includes:

classifying the log data of the plurality of users as a plurality of log data sets according to each content of the contents, wherein the classifying of the log data of the plurality of users includes (i) classifying log data of the first user for the first content and log data of the second user for the first content as a first log data set of the plurality of log data sets, and (ii) classifying log data of the first user for the second content and log data of the second user for the second content as a second log data set of the plurality of log data sets, and training the PLM based on back-propagation information corresponding to each content of the contents by inputting each of the plurality of classified log data sets to the PLM to increase accuracy of the task model, wherein a total number of the classified log data sets is the same as a total number of the contents, and wherein the training of the PLM based on the back-propagation information corresponding to each content of the contents is performed as many as the total number of the contents.

5. A learning device for tuning a task model using a pretrained language model (PLM), the learning device comprising:

a transceiver configured to transmit/receive a content set including a plurality of pieces of contents and log data of a plurality of users for the contents included in the content set; and a controller configured to train the PLM and the task model based on the contents and the log data, wherein the controller is configured to:

acquire the log data of the plurality of users for the contents included in the content set consumed by the plurality of users and the contents included in the content set, the plurality of users including a first user and a second user, and the contents including a first content and a second content, acquire text embedding for the contents included in the content set through the PLM, acquire an output value related to a task of the task model from the text embedding and the log data through the task model, update a weight of the task model based on the output value and the target value of the task, and acquire back-propagation information for training the PLM from the task model, and train the PLM based on the back-propagation information, wherein the controller is further configured to:

acquire execution data for executing the PLM, the executing data including at least one of layer information, computation information and weight information of the PLM, and acquire the PLM based on the execution data, the PLM being one of a Bidirectional Encoder Representations from Transformers (BERT) model, a Generative Pre-trained Transformer 3 (GPT-3) model, a Robustly Optimized BERT Pre-Training Approach (ROBERTA) model, a Unified pre-trained Language Model (UniLM), and a Minimal Language Model (MiniLM), wherein the training of the PLM includes:

classifying the log data of the plurality of users as a plurality of log data sets according to each content of the contents, wherein the classifying of the log data of the plurality of users includes (i) classifying log data of the first user for the first content and log data of the second user for the first content as a first log data set of the plurality of log data sets, and (ii) classifying log data of the first user for the second content and log data of the second user for the second content as a second log data set of the plurality of log data sets, and training the PLM based on back-propagation information corresponding to each content of the contents by inputting each of the plurality of classified log data sets to the PLM to increase accuracy of the task model, wherein a total number of the classified log data sets is the same as a total number of the contents, and wherein the training of the PLM based on the back-propagation information corresponding to each content of the contents is performed as many as the total number of the contents.

\* \* \* \* \*